United States Patent [19]
Kroeck

[11] 3,823,874
[45] July 16, 1974

[54] CONTROL FOR LAWN SPRINKLER

[76] Inventor: Herbert Kroeck, 120 Jefferson St., East Islip, N.Y. 11730

[22] Filed: Apr. 13, 1973

[21] Appl. No.: 350,954

[52] U.S. Cl............. 239/65, 200/61.05, 340/244 C
[51] Int. Cl............................................. A01g 25/00
[58] Field of Search.............................. 239/63–65; 200/61.05; 340/244 R, 244 C

[56] References Cited
UNITED STATES PATENTS

| 2,202,197 | 5/1940 | Ewertz | 340/244 C |
| 2,776,860 | 1/1957 | Griffis | 239/65 |
| 2,799,848 | 7/1957 | Glantz et al. | 340/244 R X |
| 2,946,512 | 7/1960 | Richards | 239/63 |
| 3,224,676 | 12/1965 | Rauchwerger | 239/64 |

FOREIGN PATENTS OR APPLICATIONS

| 1,170,902 | 11/1969 | Great Britain | 239/63 |

Primary Examiner—Lloyd L. King
Assistant Examiner—Andres Kashnikow
Attorney, Agent, or Firm—Albert F. Kronman, Esq.

[57] ABSTRACT

A sprinkler control device using any type of water sprinkler and a sensing device comprising a water tank with conductive terminals. When the tank is dry or filled only to a shallow level, a control unit causes a solenoid to open the water supply valve and the sprinkler is operated. When the sensing tank is filled to a predetermined level, the control circuit operates the solenoid valve and cuts off the water. When the water evaporates from the sensing tank and is lowered to a second level, the device is again operated and the water is turned on.

An auxilliary form of sensing device, including an absorbent cotton band, can be used to control the watering system.

4 Claims, 5 Drawing Figures

PATENTED JUL 16 1974  3,823,874

CONTROL FOR LAWN SPRINKLER

BACKGROUND OF THE INVENTION

Lawn sprinklers are used in the great majority of homes to maintain a lawn in healthy condition. The sprinkling operation often requires as much as 2 hours to supply an optimum amount of water to a lawn and there is a tendency for the operator to forget to turn the water off at the proper time. Also, there may be times when the sprinkler is turned on and then the rain starts to fall. Such a condition makes it difficult to gauge the proper time duration of the sprinkling operation. The present invention, in its preferred form, measures the water applied to the lawn by conductive terminals in a sensing water tank. The tank is placed at or close to the sprinkler and when the level rises a predetermined amount, a control circuit operates a solenoid valve and shuts off the water supply.

One of the features of the invention is the control system which turns the water off when the water in the tank reaches a desired level but does not turn the water on again until the water in the tank has evaporated to a second level, considerably lower than the first.

Another feature of the invention is the sensing tank which is open to the atmosphere and is filled either by the water from the sprinkler system or by rainfall.

Another feature of the invention is the complete automatic operation of the sensing and control means. The device may be left in operation all summer, night and day, without manual control. The system will operate to provide adequate moisture for the lawn without wasting water.

The invention comprises a sensing tank and a control circuit whose output is connected to a solenoid valve in the water supply. The sensing tank is provided with three terminals, set in the nonconductive walls of the tank and connected to a control circuit. The tank is positioned within the range of the sprinkler which may be any well-known device which spreads the water over a desired area. The control circuit includes a solid state amplifier and a relay whose contacts are connected in series with a source of power and the solenoid winding of a solenoid valve. The amplifier is a two stage transistor circuit and is normally nonconductive because the first transistor stage has its base open, that is, not connected to any other part of the circuit. When the water in the tank touches the highest terminal the amplifier is made operative and the relay is actuated, closing a pair of locking contacts which maintain the relay in its operated condition and the solenoid valve in its closed condition. This condition is maintained until the water level in the sensing tank falls below a second terminal, then the amplifier is again biased to nonconduction and the relay is normalized, again opening the solenoid valve.

Other features and additional details of the invention will be disclosed in the following description, taken in connection with the accompanying drawings.

DESCRIPTION OF THE PREFERRED EMBODIMENTS

Figure 1:
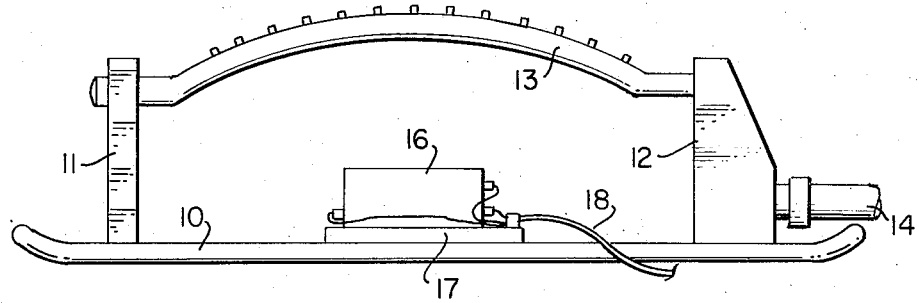
FIG. 1 is a side view of a sprinkler for watering lawns together with a sensing tank.
Figures 2, 3:
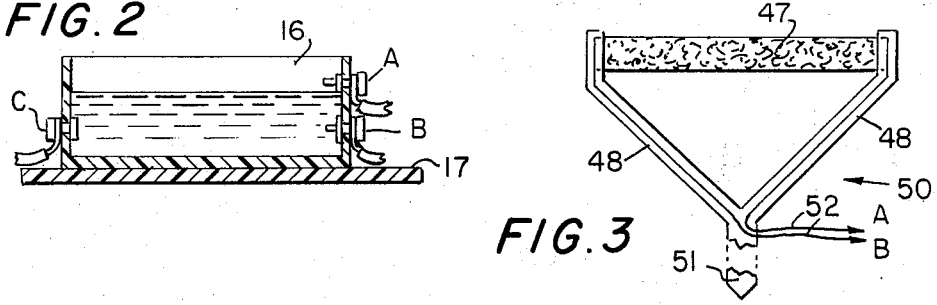
FIG. 2 is a cross sectional view of a plastic sensing tank showing three conductive terminals with the water just below the highest terminal.
FIG. 3 is a front view of an auxilliary form of sensing device.

Referring now to FIGS. 1 and 2, the device includes a well known type of sprinkler having a base support 10, two vertical supports 11 and 12 and an oscillating sprinkler pipe 13. The oscillating gearing and vane pump are housed in the support 12. A hose 14 connects the sprinkler with a solenoid valve 15 and a water supply.

A sensing tank 16 is supported on the base support 10 by means of an insulator plate 17. Three conductive terminals A, B and C are positioned in the walls of the plastic tank, the first terminal A being at the top of the tank, the second terminal B being near the bottom of the tank, and third terminal C positioned about half way between the other two.

Figure 4:
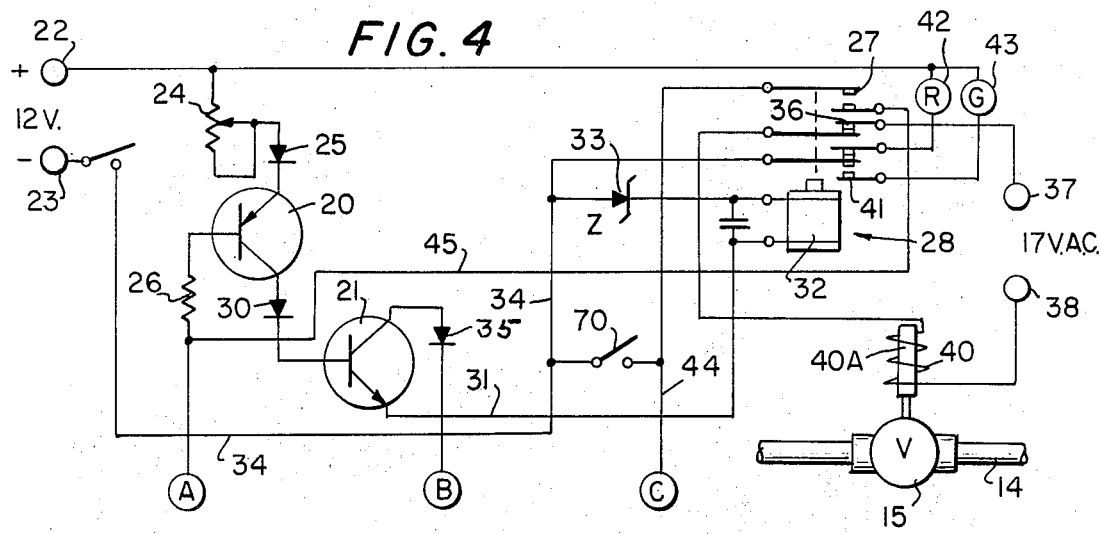
FIG. 4 is a circuit diagram of the control circuit used with the sensing tank shown in FIG. 2.

Terminals A, B, and C in the tank (FIG. 2) are connected by a cable 18 to the control circuit terminals A, B, and C shown in FIG. 4. The control circuit includes two transistor 20 and 21 connected as a two stage amplifier. Power for the transistor is applied to two terminals 22 and 23, this power may be derived from any convenient source, such as the 117 volt alternating current lighting circuit in connection with a step down transformer and a rectifier (not shown).

The amplifier circuit includes a variable resistor 24 and a diode 25 connected in series between the positive conductor and the emitter of transistor 20. The base of transistor 20 is connected through a limiting resistor 26 to the A terminal in the sensing tank 16 and also to a normally open pair of contacts 27 on relay 28. These contacts 27 are holding contacts and will be discussed later. The output of transistor 20 is applied to the base electrode of transistor 21 in series with a diode 30 and the output of transistor 21 is applied over conductor 31 to winding 32 of relay 28. The other end of winding 32 is connected through a zener diode 33 (set at 8.2 volts) to the negative conductor 34 and terminal 23. The collector electrode of transistor 21 is connected in series with diode 35 to the negative conductor 34 and the terminal B in the sensing tank 16.

A second pair of contacts 36 on relay 28 is normally closed and is connected in series between terminals 37, 38 and the solenoid winding 40. Winding 40 operates a core 40A connected to hose valve 15 to open and close it. Since contacts 36 are normally closed the winding 40 carries current to hold the valve open and permit water to flow through the sprinkler hose 14 to the sprinkler pipe 13. The third array of contacts 41 operates a pair of indicator lamps 42 and 43 to show the operator whether the relay 28 is normal or in its operated condition. If the relay 28 is normal, the red lamp 42 is lighted, and the water is flowing through the valve 15 to the sprinkler. If the relay 28 is actuated, the green lamp 43 is lighted and the water is shut off.

The operation of the sprinkler device will now be discussed. When the system is first put into operation the sensing tank 16 is empty and there is no current connection between terminals A, B, and C. The amplifier takes no current and the relay is in the normal condition shown in FIG. 4. The application of power to terminals 22, 23 causes the red lamp 42 to be lighted and as soon as the A.C. power is applied to terminals 37, 38, valve 15 is opened and water flows to the sprinkler. The water in the sensing tank 16 slowly builds up, either supplied by the sprinkler or by rain. When terminals C and B are joined in the tank by the rising water level, nothing happens since terminal C is now connected to an open contact 27. The watering continues until terminal A in the tank is reached. A small current can now flow from terminal A to terminal B, bias the base of transistor 20 to conduction and operate relay 28.

The actuation of relay 28 closes contacts 27, opens contacts 36 and transfers contacts 41 so that red lamp 42 is extinguished and green lamp 43 is lighted. When contacts 27 are closed, a circuit can be traced from terminal C in the tank, over conductor 44, through contacts 27, then over conductor 45, to terminal A in the tank and also to the base electrode of transistor 20. This circuit acts as a locking or holding circuit and joins terminals A and C. When contacts 36 are opened, current is cut off from coil 40 and the water valve 15 is closed ending the sprinkling cycle.

The water in the sensing tank is now allowed to evaporate naturally, the rate of evaporation depending upon the temperature, humidity, and rainfall. It may take several days for the level of the water in the tank to drop below the level of terminals C and B but during this time the water valve 15 remains closed and terminals A and C are connected together by conductors 44, 45 and contacts 27. When the water level finally falls below the level of terminals A and C, the cut-off bias on transistor 20 is again applied and the relay 28 is normalized. Contacts 36 are closed, the valve 15 is opened and sprinkling is resumed.

Figure 5:
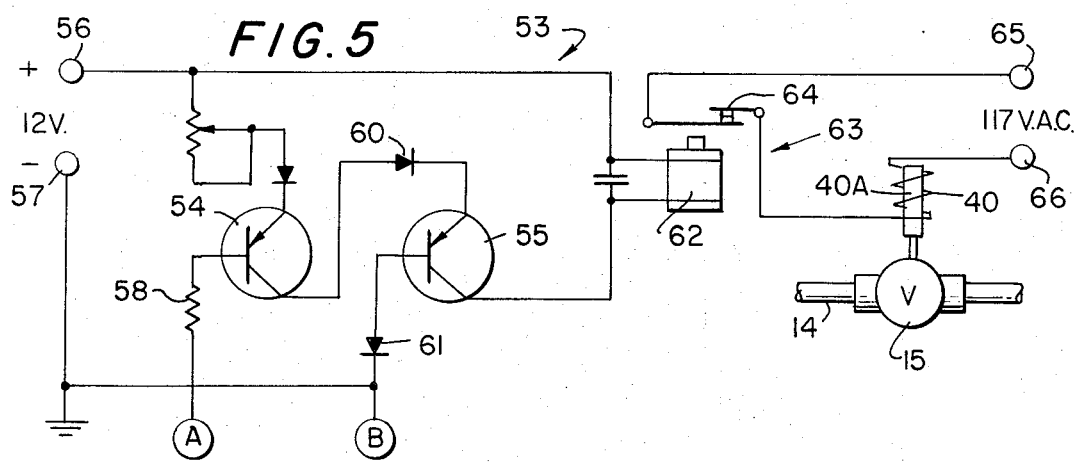
FIG. 5 is a diagram of the circuit control means used with the auxilliary sensing means shown in FIG. 3.

Referring now to FIGS. 3 and 5, an auxilliary device is shown including a sensing device having a thick band of cotton fabric 47 stretched between two arms 48 of a V-shaped holder 50. The cotton holder 50 may be mounted on the lawn by means of a pointed shaft 51 stuck into the ground. The ends of the cotton band 47 are connected to wires 52 which are positioned within the arms 48 and are connected to terminals A and B in the control circuit 53 shown in FIG. 5. When the cotton band 47 is dry, it is nonconductive but when a sprinkler or rain soaks the cotton fibers, electric conduction occurs and terminals A and B in circuit 53 are connected together.

Circuit 53, shown in FIG. 5 comprises a solid state amplifier including transistors 54 and 55. The amplifier is powered by a 12 volt supply applied to terminals 56, 57. The base electrode of transistor 54 is connected to terminal A in series with a limiting resistor 58. The output from transistor 54 is sent from its collector through diode 60 to the second transistor 55, having its base electrode connected to the negative terminal 57 and terminal B in series with the diode 61. The output from transistor 55 is connected to winding 62 of a relay 63 which includes normally closed contacts 64. The other side of relay winding 62 is connected to the positive terminal 56. Contacts 64 are connected to the A.C. power supply terminals 65, 66 in series with the solenoid winding 40 which controls the water valve 15 as described above.

The operation of this device is as follows: When the device is first put into use, the cotton band 47 is dry and nonconductive. The base electrode of transistor 54 is not connected electrically to any other part of the circuit and the amplifier is nonconductive, leaving relay 63 in its normal unoperated condition. Contacts 64 are closed and the solenoid winding 40 receives current from the A.C. line opening valve 15 and sending water through hose 14 to the sprinkler. The cotton band 47 is placed in a position where it receives water from rain and, when it gets wet enough to conduct, terminal A is electrically joined to terminal B, grounding the base electrode of transistor 54 and making both stages of the amplifier active. An output current is sent from transistor 55 to the winding 62 of relay 63 opening contacts 64 and thereby closing valve 15 to stop the sprinkling action. When the cotton band dries out and becomes an insulator again, the sprinkler cycle is repeated.

It should be noted that the amplifier circuits in both FIGS. 4 and 5 include three diodes as safty measures in case the polarities of the power supplies are reversed. Also, to absorb the inductive transient occasioned by a sharp reduction of current in the relay windings 32 and 62, both windings are bridged by a capacitor.

In one practical circuit application the following circuit components were used:

| | |
|---|---|
| transistor 20 | 2N 3741 PNP |
| transistor 21 | SK 3021 NPN |
| resistor 24 | 500 ohms |
| resistor 26 | 82,000 ohms |
| all diodes | 4,003 |
| Relay | Sigma 50 RO3-12DC |

In FIG. 4, a switch 70 has been added so that an operator can close the switch at the control circuit, stop the sprinkling action and then move the sprinkler to a new location.

Having thus fully described the invention, what is claimed as new and desired to be secured by Letters Patent of the United States is:

1. A control system for a lawn sprinkler including a base which delivers a desired amount of water to a lawn area comprising:
   a. a water sensing device including a nonconductive tank secured to the base of the sprinkler for collecting water from the sprinkler and from atmospheric precipitation;
   b. electrical means for sensing the water level in the tank, said means including at least two terminals which pass current through the water only when the collected water has reached a predetermined height in the tank and wets both terminals;
   c. an amplifier having input and output circuits, the input circuit connected to said tank terminals and arranged to provide a current in its output circuit only when the input circuit is bridged by water;
   d. a relay having its winding connected to the output circuit of said amplifier and a pair of normally closed contacts which are opened when the relay is activated; and
   e. a solenoid water valve for turning the sprinkler water on and off, comprising a valve connected in a water supply hose which sends water to the sprinkler and a solenoid winding connected to said relay contacts in series with an electrical power supply.

2. A sensing device according to claim 1 wherein said tank is provided with three terminals, a first pair of terminals for activating the relay and latching it in its actuated condition to turn off the water and a second pair of terminals for unlatching the relay to turn on the water after the water level has dropped to a predetermined level.

3. A sensing device according to claim 2 wherein said relay includes a pair of normally open latching contacts which are closed when the relay is actuated, said contacts connected in series between one of the three tank terminals and a portion of the amplifier.

4. A control system for a lawn sprinkler which delivers a desired amount of water to a lawn comprising:
   a. a water sensing device including an absorbent material which is nonconductive when dry but conductive when wet, said sensing device comprising a Y-shaped insulator having two upper prongs and a pointed base shaft positioned adjacent to the sprinkler and adapted to receive water from the sprinkler when the water is turned on, said absorbent material connected between the upper prongs of the insulator;
   b. electrical means for sensing the conductivity of said material, said means including two electrodes connected to said material in spaced relation;
   c. an amplifier having input and output circuits, the input circuit connected to said electrodes and arranged to provide a current in its input circuit only when the resistance between the electrodes falls below a predetermined value;
   d. a relay having its winding connected to the output circuit of said amplifier and a pair of normally closed contacts which are opened when the relay is actuated; and
   e. a solenoid water valve for turning the sprinkler water on and off, comprising a valve connected in a water supply hose which sends water to the sprinkler and a solenoid winding connected to said relay contacts in series with an electrical power supply.

* * * * *